US009242738B2

(12) United States Patent
Kroo

(10) Patent No.: US 9,242,738 B2
(45) Date of Patent: *Jan. 26, 2016

(54) PERSONAL AIRCRAFT

(71) Applicant: Zee.Aero Inc., Mountain View, CA (US)

(72) Inventor: Ilan Kroo, Stanford, CA (US)

(73) Assignee: Zee.Aero Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/931,954

(22) Filed: Jun. 30, 2013

(65) Prior Publication Data

US 2013/0311008 A1 Nov. 21, 2013

Related U.S. Application Data

(63) Continuation of application No. 13/553,438, filed on Jul. 19, 2012, now Pat. No. 8,485,464.

(60) Provisional application No. 61/509,530, filed on Jul. 19, 2011.

(51) Int. Cl.
*B64C 27/22* (2006.01)
*B64D 31/00* (2006.01)
(Continued)

(52) U.S. Cl.
CPC . *B64D 31/00* (2013.01); *B64C 3/16* (2013.01); *B64C 29/00* (2013.01); *B64C 29/0025* (2013.01); *B64C 39/12* (2013.01); *Y02T 50/12* (2013.01)

(58) Field of Classification Search
USPC .............. 244/17.11, 17.23, 6, 45 A, 45 R, 55
See application file for complete search history.

(56) References Cited

U.S. PATENT DOCUMENTS

| 1,425,555 | A | 8/1922 | Thompson |
| 3,856,238 | A | 12/1974 | Malvestuto |
| 6,293,491 | B1 | 9/2001 | Wobben |
| 6,561,456 | B1 | 5/2003 | Devine |

(Continued)

FOREIGN PATENT DOCUMENTS

| CN | 1978277 A | 6/2007 |
| GB | 1 421 013 A | 1/1976 |

(Continued)

OTHER PUBLICATIONS

Australian Government, IP Australia, Patent Examination Report No. 1, Australian Patent Application No. 2011282250, Apr. 19, 2013, four pages.

(Continued)

*Primary Examiner* — Brian M O'Hara
(74) *Attorney, Agent, or Firm* — Fenwick & West LLP

(57) ABSTRACT

A safe, quiet, easy to control, efficient, and compact aircraft configuration is enabled through the combination of multiple vertical lift rotors, tandem wings, and forward thrust propellers. The vertical lift rotors, in combination with a front and rear wing, permits a balancing of the center of lift with the center of gravity for both vertical and horizontal flight. This wing and multiple rotor system has the ability to tolerate a relatively large variation of the payload weight for hover, transition, or cruise flight while also providing vertical thrust redundancy. The propulsion system uses multiple lift rotors and forward thrust propellers of a small enough size to be shielded from potential blade strike and provide increased perceived and real safety to the passengers. Using multiple independent rotors provides redundancy and the elimination of single point failure modes that can make the vehicle non-operable in flight.

16 Claims, 6 Drawing Sheets

(51) Int. Cl.
*B64C 3/16* (2006.01)
*B64C 29/00* (2006.01)
*B64C 39/12* (2006.01)

(56) References Cited

U.S. PATENT DOCUMENTS

| | | | |
|---|---|---|---|
| 6,843,447 | B2 | 1/2005 | Morgan |
| 6,969,026 | B2 | 11/2005 | Kayama |
| 7,159,817 | B2 | 1/2007 | VanderMey et al. |
| 8,393,564 | B2 | 3/2013 | Kroo |
| 8,485,464 | B2 * | 7/2013 | Kroo .................. 244/6 |
| 2003/0038213 | A1 | 2/2003 | Yoeli |
| 2003/0062443 | A1 | 4/2003 | Wagner et al. |
| 2004/0065772 | A1 | 4/2004 | Malvestuto |
| 2006/0142904 | A1 | 6/2006 | Caillaud et al. |
| 2008/0054121 | A1 | 3/2008 | Yoeli |
| 2009/0216392 | A1 | 8/2009 | Piasecki et al. |
| 2011/0031355 | A1 | 2/2011 | Alvarez Calderon |

FOREIGN PATENT DOCUMENTS

| | | |
|---|---|---|
| JP | 49-019599 | 2/1974 |
| JP | 03-082699 | 8/1991 |
| JP | 05-077789 | 3/1993 |
| JP | 05-262295 | 10/1993 |
| JP | H06-502364 | 3/1994 |
| JP | 2001-071998 | 3/2001 |
| JP | 2004-026034 | 1/2004 |
| JP | 2004-210266 | 7/2004 |
| JP | 2006-290255 | 10/2006 |
| JP | 2009-083798 | 4/2009 |
| JP | 2013-532601 | 8/2013 |
| WO | WO 2006/113877 A2 | 10/2006 |

OTHER PUBLICATIONS

Canadian Intellectual Property Office, First Office Action, Canadian Patent Application No. 2,801,651, Apr. 10, 2013, three pages.

Israel Aerospace Industries, Ltd, "Israel Aerospace Industries to Unveil the 'Panther'—A New UAV for Tactical Missions—at 2010 Latrun Conference," Oct. 4, 2010, one page. [Online] [Retrieved Oct. 6, 2010] Retrieved from the Internet <URL:http://www.iai.co.il/32981-41360-en/MediaRoom_News.aspx.>.

Japanese Patent Office, Office Action, Japanese Patent Application No. JP 2013-520824, Jul. 2, 2013, four pages.

Korean Intellectual Property Office, Notice of Preliminary Rejection, Korean Patent Application No. 10-2013-7004144, Apr. 8, 2013, ten pages.

Korean Intellectual Property Office, Notice of Final Rejection, Korean Patent Application No. 10-2013-7004144, Aug. 5, 2013, four pages.

New Zealand Intellectual Property Office, IP No. 607121, Aug. 13, 2013, two pages.

PCT International Search Report and Written Opinion, PCT Application No. PCT/US2011/044591, Mar. 2, 2012, eight pages.

PCT International Search Report and Written Opinion, PCT Application No. PCT/US2012/047467, Jul. 19, 2012, ten pages.

Canadian Intellectual Property Office, Office Action, Canadian Application No. 2,801,651, Nov. 26, 2013, three pages.

European Patent Office, Supplementary European Search Report and Opinion, European Patent Application No. 11810313.4, Oct. 10, 2013, six pages.

Korean Intellectual Property Office, Office Action, Korean Patent Application No. 10-2013-7004144, Dec. 10, 2013, four pages.

Canadian Intellectual Property Office, Office Action, Canadian Patent Application No. 2,801,651, Jul. 2, 2014, 2 Pages.

Japanese Intellectual Property Office, Office Action, Japanese Patent Application No. 2014-521800, Jul. 1, 2014, 9 Pages.

Korean Intellectual Property Office, Office Action, Korean Patent Application No. 10-2014-7003769, May 26, 2014, 19 Pages.

* cited by examiner

PERSONAL AIRCRAFT

CROSS-REFERENCE TO RELATED APPLICATIONS

This application is a continuation of U.S. application Ser. No. 13/553,438, now U.S. Pat. No. 8,485,464, filed on Jul. 19, 2012, which claims the benefit of provisional application No. 61/509,530, filed on Jul. 19, 2011. Both applications are incorporated by reference herein in their entirety.

BACKGROUND

1. Field of the Invention

This disclosure relates generally to a personal aircraft configured to provide safe operations while achieving robust control. In particular, the described embodiments include an aircraft with vertical takeoff and landing capability, and that provides vertical and horizontal thrust in a controlled fashion for hover, transition and cruise flight.

2. Description of Related Art

Taking off and landing vertically, instead of using a runway to develop sufficient velocity on the ground for wings to provide adequate lift, requires an aircraft to provide both vertical and forward thrust. Thrust produced in the vertical direction provides lift to the vehicle; thrust produced horizontally provides forward movement. A vertical takeoff and landing (VTOL) aircraft can produce both vertical and horizontal thrust, and is able to control these forces in a balanced fashion.

The rotary wing aircraft, or helicopter, is one common type of VTOL aircraft. Helicopters have large rotors that provide both vertical and horizontal thrust. For the rotors to perform this dual function across a range of airspeeds, the rotors are typically quite complex. Depending on the vehicle flight condition, the rotor blades must be at different orientation angles around the 360 degrees of azimuth rotation to provide the needed thrust. Therefore, rotors have both collective and cyclic variation of the blade orientation angle. Collective varies the angle of each blade equally, independent of the 360-degree rotation azimuth angle. Cyclic varies the blade angle of attack as a function of the 360-degree rotation azimuth angle. Cyclic control allows the rotor to be tilted in various directions and therefore direct the thrust of the rotor forwards, backwards, left or right. This direction provides control forces to move the helicopter in the horizontal plane and respond to disturbances such as wind gusts.

Helicopter rotors are large and unprotected from hitting nearby obstacles. Additionally, they utilize mechanically complex systems to control both the collective and cyclic blade angles. Such rotors are mechanically complex and require maintenance. The rotors generally rotate at a low speed; this results in heavy transmissions between the rotor and motor. The transmissions, or gearboxes, decrease the vehicle payload potential, as well as vehicle safety. Because of the mechanical complexity across the entire vehicle system, many parts are single points of failure. Because of this lack of redundancy, frequent inspections and maintenance are required to keep the vehicle safe.

SUMMARY

The described embodiments provide a personal aircraft with a configuration that is safe, quiet, and efficient, as well as easy to control, highly compact, and able to accomplish vertical takeoff and landing with transition to and from forward flight. In one embodiment, the aircraft configuration includes multiple rotors oriented to provide vertical thrust for lift and control during takeoff, transition to and from forward flight, and landing. The rotors are attached to the airframe in fixed, non-planar orientations. The orientations of rotors provide lateral and, in some embodiments, fore and aft control of aircraft without requiring a change of attitude, and minimize disturbances to the flow when the aircraft is cruising. In various embodiments, the rotors have forward, backwards, left, and right orientations, and are located longitudinally along the port and starboard sides of the fuselage, with two or more rotors located on each side.

The fuselage carries a variable-weight payload. The aircraft has tandem wings at the front and rear of the vehicle. The wings provide lift and control during cruise, and one or more propellers provide forward thrust. The combination of vertical lift rotors and front and rear tandem wings bound the rotors, permitting movement in the aircraft's center of gravity while still enabling the vehicle to maintain vertical and horizontal flight control. The forward and rear wings are also located to provide a boundary to avoid foreign object damage (FOD) to the lift rotors. The control surfaces, which include elevator and ailerons, are usable to compensate for changes in CG of the aircraft during flight by adjusting the center of lift, in addition to changing angle of attack and attitude. The vertical lift rotors are arranged around the CG, and the thrust of each rotor is adjustable, which permits the relocation of the center of lift in vertical flight if the CG shifts.

Due to the multiple number and independence of the vertical lift rotors, the vertical thrust is redundant and thrust and control remain available even with the failure of any single rotor. Since there are multiple vertical rotors that provide large control forces, the rotors are smaller, with faster response rates for operation even in gusty wind conditions. In one embodiment, a separate electric motor and controller powers each vertical lift rotor, in order to provide lift system redundancy from failure of one or more lifting rotors. In other embodiments, the vertical thrust rotors are embedded in ducts that conceal them and provide increased lift. Other embodiments are relatively open with protective shrouding to act as guards to prevent contact with other objects and prevent FOD to the rotors. The protective shielding in combination with in-line vertical lift rotors provide low cruise drag for efficient flight. Low tip speed vertical lift rotors are used in various embodiments to produce low community noise levels during takeoff, transition, and landing. Embodiments with a low front wing and high rear wing with winglets provide high aerodynamic efficiency while also providing yaw stability for the aircraft. In some embodiments, the wings fold to provide a compact vehicle footprint when in hover or while on the ground. Some embodiments of the wing have control surfaces only on the inner part of the wing fold so that no articulating control linkages are required. Since the lift rotors that are used for vertical lift are separate from the forward thrust propellers, each is optimized for its specific operating conditions. Such a vehicle can be used for either piloted or unpiloted embodiments across a range of occupant sizes or payloads.

DETAILED DESCRIPTION

Figure 1:
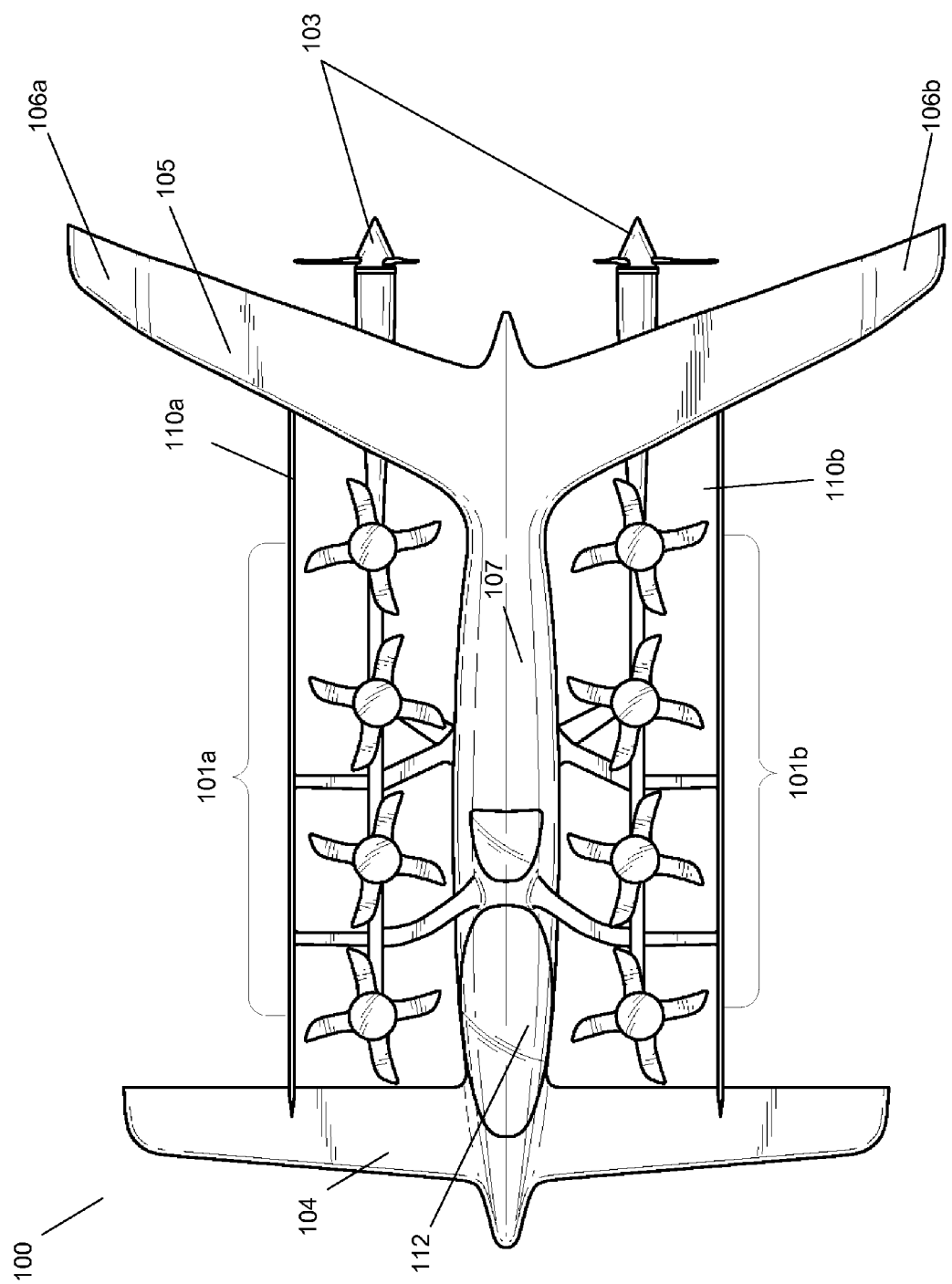
FIG. 1 is a top view of a personal aircraft vehicle in accordance with one embodiment.
Figure 2:
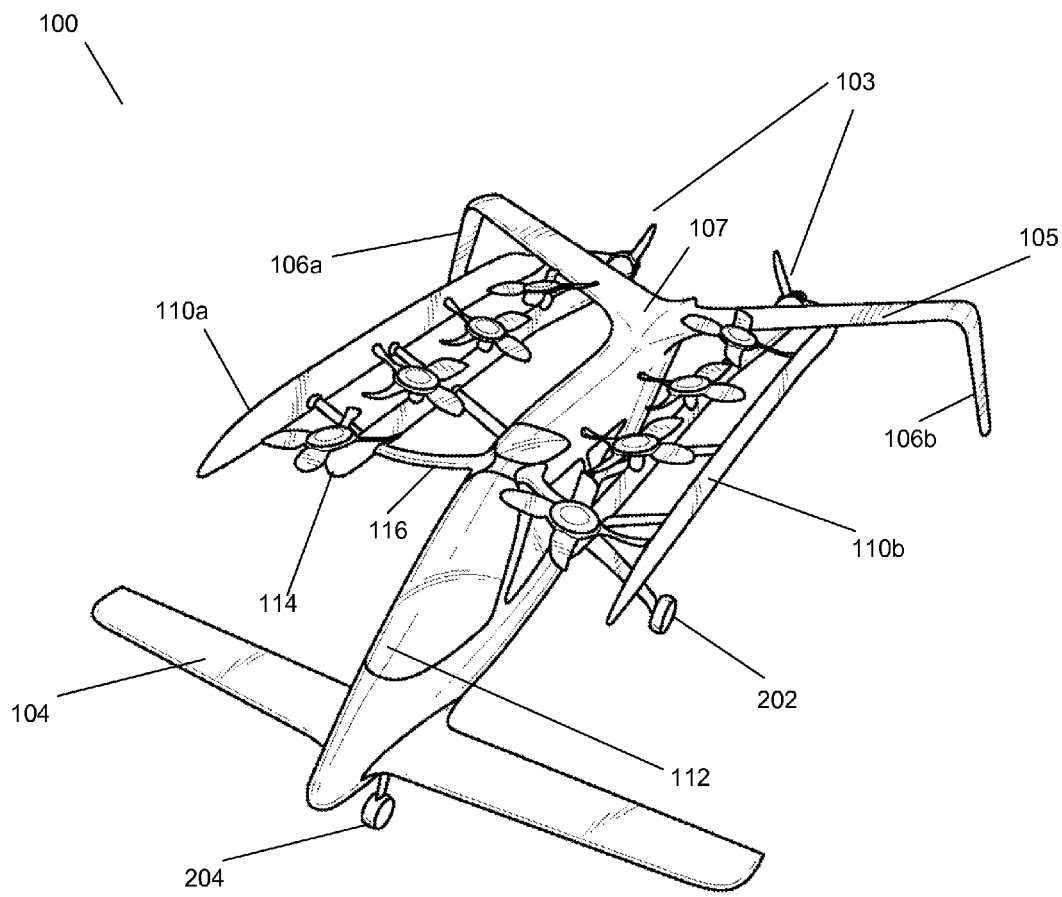
FIG. 2 illustrates a second view of a personal aircraft vehicle in accordance with one embodiment.
Figure 3:
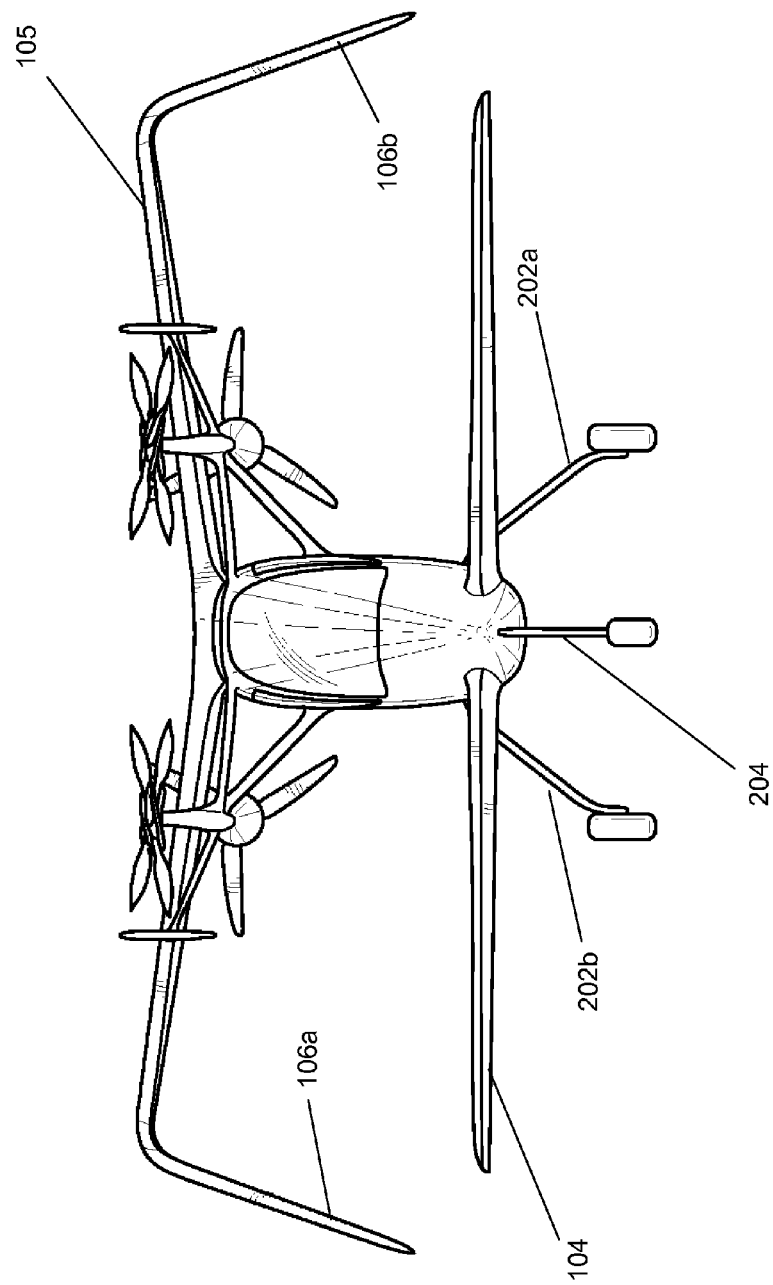
FIG. 3 illustrates a front view of a personal aircraft vehicle in accordance with one embodiment.
Figure 4:
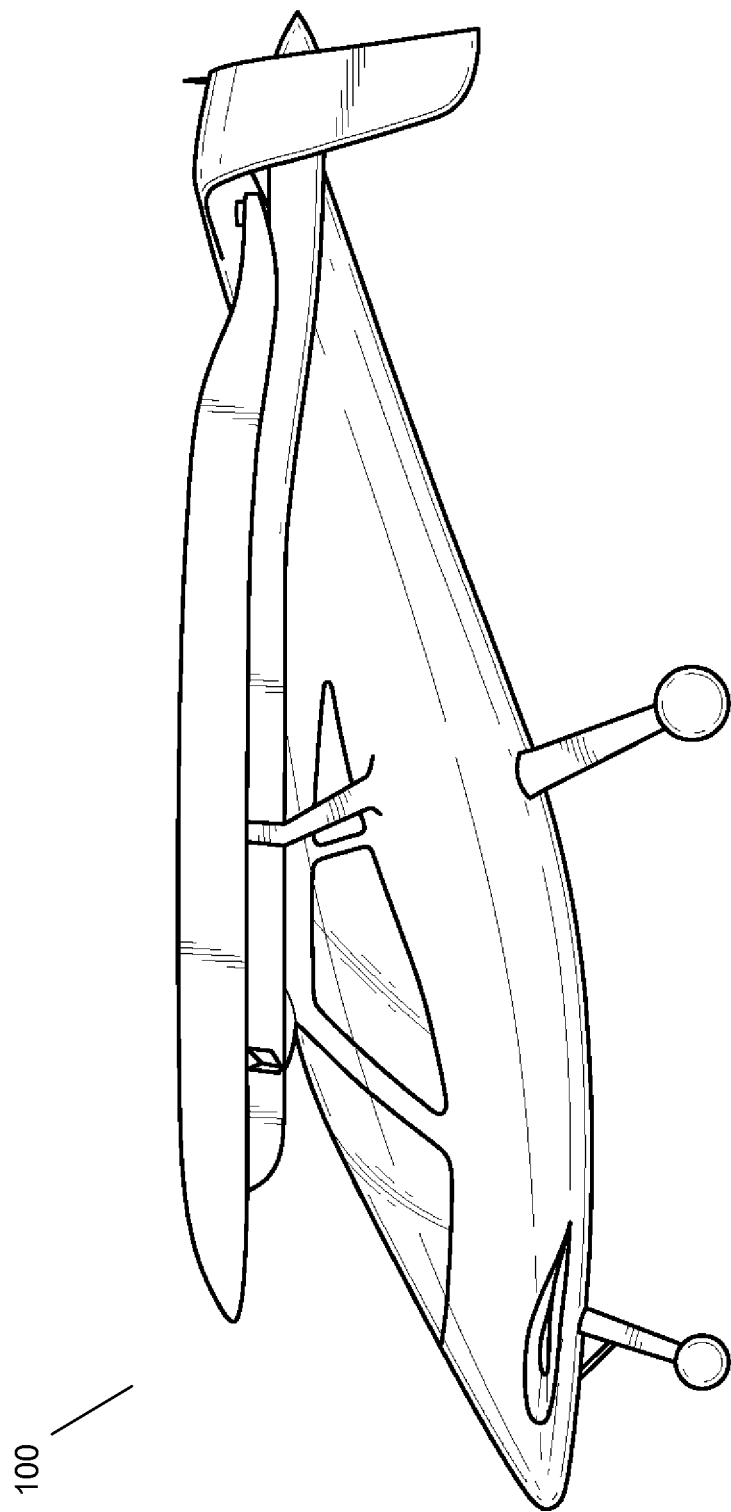
FIG. 4 illustrates a view of the left side of a personal aircraft vehicle in accordance with one embodiment.

FIG. 1 illustrates a personal aircraft 100 in accordance with one embodiment. Aircraft 100 includes vertical lift rotor assemblies 101a and 101b (generally, 101) with fixed orientations; forward flight propellers 103; a forward wing 104; a rear wing 105 having winglets 106a and 106b (generally, 106); fences 110a and 110b (generally, 110), a cockpit area 112 and a fuselage 107. Fuselage 107 also includes landing gear, a flight computer and power source (not shown), each of which is described further below. FIG. 2 illustrates a second view of personal aircraft 100, including propulsion booms 114, port-side main landing gear 202 and forward landing gear 204. FIG. 3 illustrates a front view of personal aircraft 100, in which port landing gear 202a, starboard landing gear 202b and nose gear 204 are visible. FIG. 4 illustrates a view of the left (port) side of aircraft 100 in accordance with one embodiment.

In various embodiments, aircraft 100 is sized to accommodate a single pilot and personal cargo. For example, in various embodiments the length of the aircraft from nose to its aftmost surface is between 15 and 20 feet, and its wingspan is between 15 and 20 feet. In alternative embodiments, the aircraft may be longer or shorter, wider or narrower, as will be appreciated by those of skill in the art, without departing from the principles described here.

Aircraft 100 is constructed in various embodiments primarily of a composite material. Fuselage 107 and wings 104, 105 are made from carbon fiber composite material. In alternative embodiments, the wings may have metal fittings and ribs attached to the inside and outside of a carbon fiber composite wing skin. In some embodiments the wing skins may comprise composite materials made of carbon fiber combined with other composite materials such as Kevlar. In other alternative embodiments, the fuselage may comprise a metal truss made from steel or aluminum with a composite skin that covers the truss. The composite fuselage skin in this embodiment may be made of carbon fiber, Kevlar, or other composite materials as understood by those of skill in the art. The cockpit windows in one embodiment are polycarbonate, though other lightweight clear plastics may also be used. Fences 110 are made from a Kevlar and carbon fiber composite.

Rotor assemblies 101 include rotors that in one embodiment have a 16 inch radius, and are made from carbon fiber composite material, and in an alternative embodiment from carbon fiber composite blades attached to an aluminum hub. In other embodiments, rotors are made from wood blades attached to an aluminum hub, or wood blades attached to a carbon fiber composite hub. The rotors may be a single piece that bolts onto the motor assembly. Rotor assemblies 101 are described further below.

Aircraft 100 includes a forward wing 104 and an aft wing 105. To maintain minimal length and width and have the CG in the center of the rotor system, the forward and aft wings are similar in span. The aft wing is swept back and has winglets 106 at its ends. The winglets provide lateral stability and decrease the drag due to lift on the aft wing. Sweeping the wing back improves the pitch stability of the aircraft and increases the benefits of the winglets on lateral stability. In some embodiments the aft wing can fold, and thus maintain the same overall vehicle length as an aircraft with an unswept aft wing. Additionally, the sweep of the aft wing provides more space for the rotors to fit into. Forward wing 104 is also attached to fuselage 107 at a point substantially lower than is aft wing 105 in various embodiments. A non-planar wing lifting system enables the wings to develop efficient lift during cruise flight. In one embodiment, the vertical separation between the two wings is chosen to be as large as possible, given the constraint of attaching to the fuselage. By maximizing the wing vertical separation, the negative aerodynamic interaction between the front wing and the rear wing is reduced. Thus, the drag due to lift of the vehicle is significantly decreased, for example by 15-20% compared to a single in-plane wing lifting system.

The winglets 106 are located at the tip of rear wing 105 to provide decreased drag due to lift on the rear wing, as well as yaw or directional stability and control. The particular winglet shape is established for adequate stability, as will be understood by those skilled in the art. In some embodiments, as illustrated in FIG. 3, the winglets extend downward and provide improved controllability by reducing the coupling between the sideslip angle of the aircraft and the yawing moment that the airflow produces on the aircraft.

In one embodiment, the tandem wing system has joints where the wingtips on each wing fold, allowing aircraft 100 to fit in a constrained space. For example, in one embodiment folding the wings enables the aircraft 100 to be stored an 8' by 7' by 16' space, or the space provided by a typical single car garage. In one embodiment the rear wing 105 has a dihedral angle of 8.4 degrees. In other embodiments the dihedral ranges between −10 and 10 degrees.

Vertical lift rotor assemblies 101 are mounted on each side of aircraft 100. In one embodiment, a propulsion boom 114 (FIG. 2) is secured to each side of the fuselage 107. In this embodiment, forward flight propellers 103 are attached to the rear end of the booms 114, and the vertical lift rotor assemblies 101 are installed on top of the booms 114. Propulsion booms 114 are attached to the fuselage 107 with struts 116. The struts 116 are positioned so that the downwash from the rotors does not impinge on the struts. In some embodiments there are three struts connecting each boom to the fuselage. In alternative embodiments there are one or two struts connecting each boom to the fuselage. In other embodiments the struts may be swept forward, aft, up, or down to improve the attachment of the booms to the fuselage. For example, in an alternative embodiment a vertically oriented support structure provides increased bending stiffness from the vertical lift rotor loads during hover.

Each vertical lift rotor assembly 101 includes a rotor and a motor. The rotor may comprise blades attached to a hub, or may be manufactured as a single piece with an integral hub. The hub provides a central structure to which the blades connect, and in some embodiments is made in a shape that envelops the motor. The motor includes a rotating part and a stationary part. In one embodiment the rotating part is concentric to the stationary part, known as a radial flux motor. In this embodiment the stationary part may form the outer ring of the motor, known as an inrunner motor, or the stationary part may form the inner ring of the motor, known as an outrunner motor. In other embodiments the rotating and stationary parts are flat and arranged in opposition to each other, known as an axial flux motor. In some embodiments the motor parts are low-profile so that the entire motor fits within the hub of the rotor, presenting lower resistance to the air flow when flying forward. The rotor is attached to the rotating part of the motor. The stationary part of the motor is attached to the propulsion boom 114. In some embodiments the motor is a permanent magnet motor and is controlled by an electronic motor controller. The electronic motor controller sends electrical currents to the motor in a precise sequence to allow the rotor to turn at a desired speed or with a desired torque.

As noted, aircraft 100 includes multiple rotor assemblies 101 per side. The vertical lift rotors generate thrust that is independent of the thrust generated by the forward flight propellers 103 during horizontal cruise. The vertical lift rotors provide enough thrust to lift the aircraft off the ground and maintain control. In one embodiment, each rotor generates more, e.g., 40% more, thrust than is needed to hover, to maintain control in all portions of the flight envelope. The rotors are optimized by selecting the diameter, blade chord, and blade incidence distributions to provide the needed thrust with minimum consumed power at hover and low speed flight conditions. In various embodiments, half of the rotors rotate in one direction, and the other half rotate in the opposite direction to balance the reaction torque on the aircraft. In some embodiments, rotors directly across from each other on the port and starboard sides of the aircraft have opposite directions of rotation. In other embodiments the rotors directly across from each other have the same direction of rotation. In some embodiments, the rotors may be individually tuned to account for different interactions between the rotors, or between the airframe and the rotors. In such embodiments the tuning includes adjusting the incidence or chord distributions on the blades to account for favorable or adverse interactions and achieve the necessary performance from the rotor. In the embodiment illustrated in FIG. 1, four vertical lift rotor assemblies 101 per side are shown. In alternative embodiments more or fewer vertical lift rotors provide the vertical lift and control. When at least two rotors per side are present, the ability to produce a vertical force with equilibrium about the center of gravity is retained even when one rotor fails. This is achieved by decreasing the thrust on the opposite quadrant to the failed rotor. When three rotors per side are present, control about all three axes, or directions of flight, is available. As the number of rotors per side increases, the loss of any one rotor results in a decreasing overall loss of vertical thrust. However, with each extra pair of rotors there is increasing complexity and probability that a failure would result, as well as increased cost and weight.

In one embodiment, two vertical lift rotor assemblies 101 per side are located in front of the CG and two are located behind the CG. In this manner, the center of lift of the rotors in hover is co-located with the center of gravity of the aircraft 100. This arrangement permits a variation of longitudinal or lateral positioning of the payload in the fuselage 107. Flight computer 500 modifies the thrust produced by each vertical lift rotor independently, providing a balanced vertical lift or, alternatively, unbalanced lift to provide control.

In some embodiments, the rotor orientation provides lateral and longitudinal control of the aircraft without requiring a change of attitude. Because rotor assemblies 101 are each mounted to cant outward, inward, forward, or back, a proper combination of rotor thrusts results in a net force in the horizontal plane, as well as the needed vertical lift force. This is helpful when maneuvering near the ground, for example. In addition, in the case of a rotor failure in which a blade becomes damaged or separated, the different cant angles make it less likely that another rotor will be damaged, thus making the design more failure tolerant. The orientations are also chosen to minimize disturbances to the flow when the aircraft is cruising. In some embodiments, the orientation of the rotors is varied forward, backward, left, and right, enabling the aircraft to maneuver in any direction without changing attitude. In other embodiments, the orientation is varied only left and right, minimizing the disturbance to the flow during cruise, but meaning that the aircraft can only maneuver side-to-side, not forward and backward, without changing attitude. In one embodiment with four rotors per side, the rotors are oriented, from front to back, 10 degrees out, 10 degrees in, 10 degrees in, and 10 degrees out.

Forward flight propellers 103 provide the thrust for transition to forward flight, climb, descent, and cruise. In one embodiment two or more forward thrust propellers 103 are mounted along the span of the rear wing 105. In alternative embodiments, a single forward thrust propeller is mounted on the aft portion of the fuselage 107 at the center of the span. In other embodiments, one or more propellers are mounted to the front of the wings or propulsion booms as tractor propellers. The propellers can be rotated in opposite directions so that the torque required to turn them does not produce a net torque on the airplane. Also, the thrust of the two propellers can be varied differentially to provide a yaw control moment. Positioning on the wing results in less inflow disturbance to the propellers. Use of a single propeller on the fuselage permits fewer components and less weight, but with a different-sized motor and with the inflow including disturbances from the fuselage. In one embodiment, the forward propellers are fixed-pitch. The chord and incidence distributions are optimized to provide adequate thrust for acceleration and climbing both when the vehicle is moving slowly and supported in the air by the thrust of the rotors and when the aircraft is moving quickly and is fully supported by the lift of the wings. Additionally, the chord and incidence distributions are selected to provide efficient thrust at the cruising speed of the aircraft. In other embodiments the forward propellers utilize a variable pitch mechanism which allows the incidence of each blade to be adjusted depending on the flight condition.

The vertical lift rotors and the forward propellers are driven by electric motors that are powered by a power system. In one embodiment the power system includes a battery that is attached to one motor controller for each motor. In one embodiment the battery comprises one or more modules located within the fuselage of the aircraft. In other embodiments the battery modules are located in the propulsion booms. The battery provides a DC voltage and current that the motor controllers turn into the AC signals that make the motors spin. In some embodiments the battery comprises lithium polymer cells connected together in parallel and in series to generate the needed voltage and current. Alternatively, cells of other chemistry may be used. In one embodiment the cells are connected into 93 cell series strings, and 6 of these strings are connected in parallel. In other embodiments, the cells are connected with more or fewer cells in series and more or fewer cells in parallel. In alternative embodiments, the rotors and propellers are powered by a power system that includes a hybrid-electric system with a small hydrocarbon-based fuel engine and a smaller battery. The hydrocarbon engine provides extended range in forward flight and can recharge the battery system.

The vertical lift rotor assemblies 101 in various embodiments are protected by protective fences 110 to avoid accidental blade strikes. In some embodiments the protective fence is designed to maximize the thrust of all the rotors near the fence by providing incremental lift. In this embodiment the fence 110 is shaped so that the flow over the fence induced by the rotor system 101 creates an upward force on the fence 110. This is accomplished by selecting a cross sectional shape and angle with respect to vertical of the fence that generates the upward force. In some embodiments the fence is designed to reduce the apparent noise of the rotor system by shielding bystanders from the noise of the rotors. In these embodiments, the fences are either filled with a conventional sound absorbing material, or are coated with a conventional sounds adsorbing material. In some embodiments, aircraft 100 does not include fences 110.

As noted, the use of multiple independently controlled rotors provides a redundant lift system. For example, a system that includes six or more rotors permits hover and vertical ascent/descent with safe operation without forward airspeed, even if one or several individual components fail.

Figure 5:
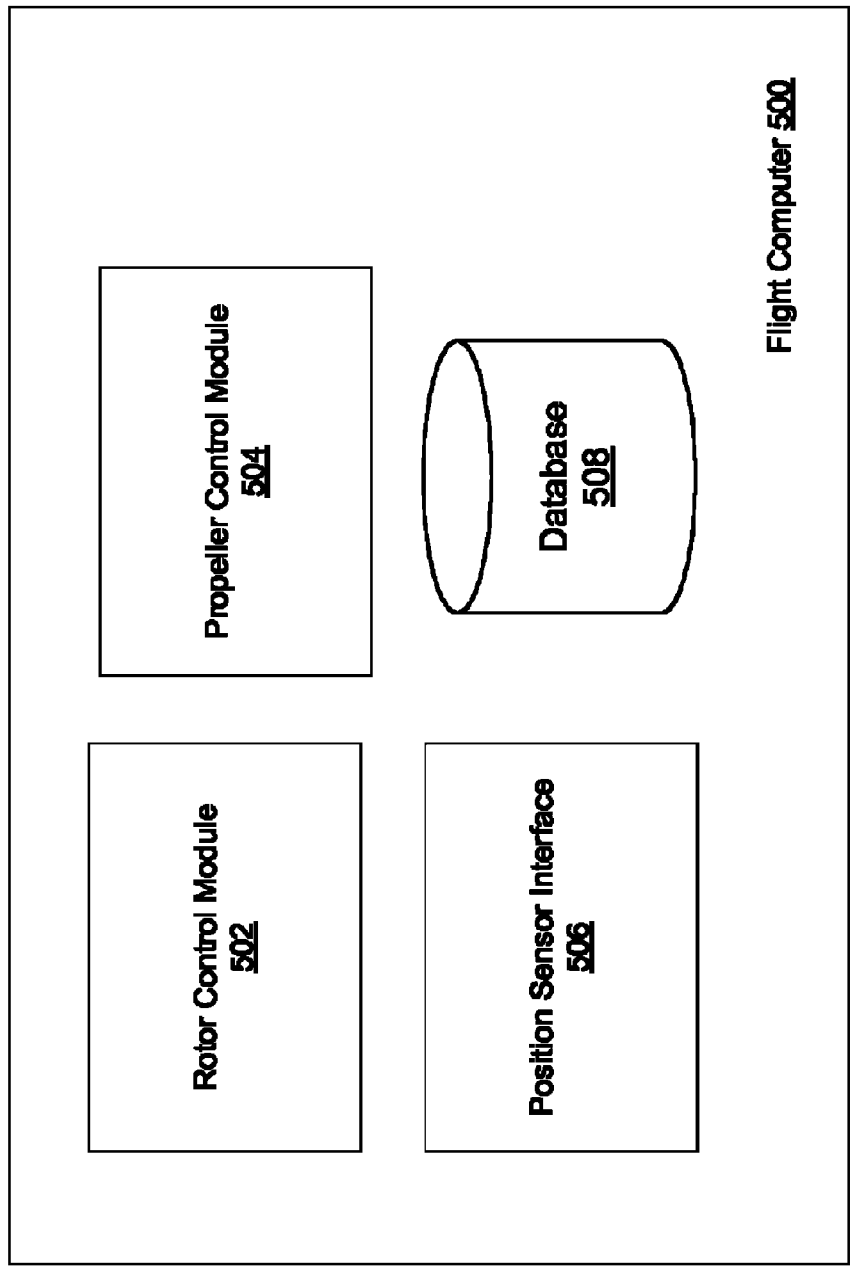
FIG. 5 is a block diagram illustrating a flight computer in accordance with one embodiment.

FIG. 5 is a block diagram of a flight computer 500 in accordance with one embodiment. Flight computer 500 is located on board aircraft 100, typically within the fuselage 107. Flight computer 500 includes a rotor control module 502, propeller control module 504, position sensor interface 506, and a database 508. Position sensor interface 506 is communicatively coupled to the aircraft's instruments and receives sensor data in one embodiment that includes the aircraft's position, altitude, attitude and velocity. Rotor control module 502 receives data from position sensor interface 506 and from control inputs in the cockpit and determines how much thrust is required from each of the vertical lift rotors 101 to achieve the commanded response. Rotor control module 502 commands each rotor assembly 101 independently to produce the determined required thrust. In the event of a rotor failure, rotor control module 502 adjusts the thrust requirements to compensate for the lost rotor. Propeller control module 504 receives data from position sensor interface 506 and from control inputs in the cockpit, determines how much forward thrust is required from each of the propellers 103, and commands the propellers to produce the required thrust. Database 508 includes programmed trajectories for ascent and descent to be used during transition, and may also include additional features used for navigation and control of aircraft 100 as will be appreciated by those of skill in the art. Flight computer 500 also includes other components and modules to perform navigation and flight operations and which are known to those of skill in the art, but not germane to this description.

Figure 6:
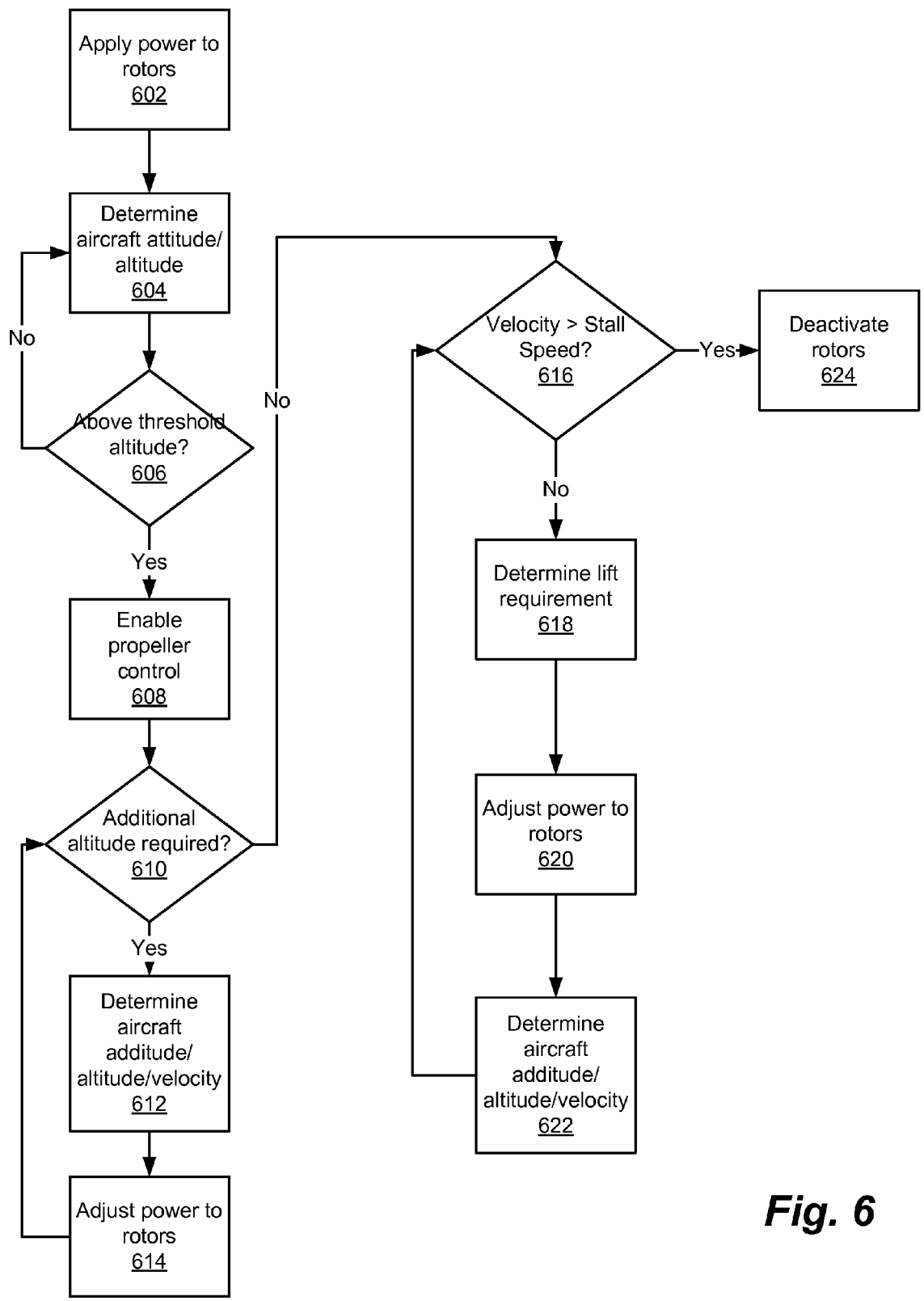
FIG. 6 is a flowchart illustrating a method for transitioning from vertical takeoff to forward flight in accordance with one embodiment.

FIG. 6 illustrates a method for transitioning from vertical to forward flight in accordance with one embodiment. To begin, rotor control module 502 of flight computer 500 applies 602 power to the rotors. In one embodiment, equal power is applied to each of the rotors during this initial phase of takeoff. In alternative embodiments different power is applied to each rotor during the initial phase of takeoff to facilitate taking off from a slope, or in a crosswind. Position sensor interface 506 receives 604 attitude and altitude data from aircraft instruments. Once a minimum altitude, e.g., 200 feet above ground level, has been reached 606, propeller control module 504 activates 608 the forward propellers and in some embodiments activates their control input inside the cockpit. This prevents the aircraft from being accelerated forward under power at altitudes where ground obstructions may present a safety hazard. In an alternative embodiment, no minimum altitude is required for powered forward propulsion. In other embodiments, the minimum altitude is adjustable and/or overrideable. For example, tall trees may demand a higher initial ascent before beginning acceleration.

In some embodiments, the pilot programs an initial altitude into flight computer 500. Alternatively, the pilot uses flight control input to indicate that a higher altitude is desired. If 610 additional altitude is required, position sensor interface 502 determines 612 the aircraft's attitude and velocity and rotor control module 502 adjusts 614 power to the rotors individually as needed to maintain vertical thrust and a level orientation.

Once 610 the aircraft 100 has attained the desired initial altitude, position sensor interface 506 determines 616 whether the forward velocity of the aircraft is sufficiently large to generate lift, i.e., whether the aircraft's speed is greater than its stall speed. If not, flight computer 500 determines 618 how much lift is required from the rotors, and applies 620 the required power. In one embodiment, the amount of lift required is the amount required to maintain the aircraft's altitude in view of the lift generated by the airfoils. As the speed increases, the wings develop lift and the thrust required of the vertical lift rotors is decreased. In one embodiment, the thrust from the rotors is adjusted to maintain during the transition an optimal trajectory and reject any disturbances due to interactions or environmental effects such as gusts. In one embodiment, the optimal trajectory is determined prior to flight and stored by flight computer 500 in database 508. Flight computer 500 continues to determine 622 the aircraft's attitude, altitude and velocity and adjust rotor power until a desired speed is reached or a minimum level of lift is being generated by the airfoils. Once 616 the speed is greater than the stall speed, i.e., high enough that the wings can support the entire weight of the aircraft, or in an alternative embodiment a different minimum speed is reached, the vertical lift rotors are completely deactivated 624.

To transition the aircraft 100 from forward to vertical flight, propeller control module 504 reduces the thrust of the forward propellers 103 to reduce speed. As the speed of the aircraft 100 is reduced, rotor control module 502 automatically commands the rotors to begin generating vertical lift. The thrust required of the vertical lift rotors increases as the lift on the wings decreases. The thrust from the rotors is adjusted by rotor control module 502 in response to readings from position sensor interface 506 to maintain during the transition an optimal trajectory determined by the flight computer, e.g., based on a trajectory stored in database 508, and reject any disturbances due to interactions or environmental effects such as gusts. Eventually the forward speed is zero or approaching zero and the vertical lift rotors provide all the lift. The vehicle then descends to the ground either via a descent command from the pilot, or by flight computer 500 automatically reducing power to the individual rotors to maintain a desired descent rate and a level orientation.

As noted, wing 104 and 105 fold in some embodiments. Some embodiments have a wing fold that is positioned at a location where the loads are small, outboard of 50% of the span, for example, to permit a lighter weight hinge. In other embodiments, the forward wing does not fold. In other embodiments, the wings fold so the aircraft can fit into an 8' wide space, such as a typical single car garage. Alternative embodiments also include folding the forward wing in other ways, such as in a scissor motion underneath the fuselage or along the side of the fuselage. This scissor folding is accomplished through pivot and pin at the center of the front wing that permits a rotation backwards about that center pivot point. This embodiment permits wing articulation about a single point to reduce weight at a location where the wing structural depth is largest, as well as enabling the front wing to be folded completely away to the side of the vehicle by an electro mechanical actuator to promote better pilot visibility while in hover or on the ground. In an embodiment including a scissor-fold front wing, the landing gear includes a single front wheel 204 with two main rear landing gear wheels 202.

In one embodiment, aircraft 100 is capable of taking off and landing with the front and rear wings folded. Taking off and landing with the wings folded in vertical flight decreases the gust response of the vehicle due to unsteady wind conditions through decreased wing lift performance and shorter wing spans. Since the wing lift is not required in hover flight, but only in forward flight, is it possible to wait to unfold the wings until sufficient altitude is achieved away from ground. Avoiding ground wing unfolding is advantageous for some operations where the ground takeoff and landing space available and wind conditions are not favorable. An electromechanical actuator provides the actuation force to unfold the wing before commencing forward flight.

In one embodiment, control surfaces are located on the inner portion of the front wing fold 301 and rear wing fold 302 to permit folding without control lines required outboard of the folding hinge mechanism to provide less mechanical complexity through fewer moving parts. The control surfaces provide pitch, roll, and yaw control during forward flight aerodynamically so that the vertical lift rotors are not required for control except at low or zero forward speed. Other embodiments that require greater forward flight control responsiveness also have control surfaces outboard of the wing fold mechanism. Other embodiments only have control surfaces on the outboard section of the wing.

Landing gear 202, 204 is provided with wheels to permit the aircraft to move while on the ground. One forward 204 and two rear 202 main landing gear provide lower drag and less lift interference on the front wing. In other embodiments the landing gear is a skid and has no wheels, since the aircraft is capable of takeoff and landing without forward movement. Alternative embodiments include two forward and one rear main landing gear to permit the front landing gear to be widely separated for ground stability. In some embodiments, some or all of the wheels are fitted with electric motors that allow the wheels to be driven. Such motors allow the vehicle to be self-propelled while on the ground.

In addition to the embodiments specifically described above, those of skill in the art will appreciate that the invention may additionally be practiced in other embodiments. For example, in an alternative embodiment, aircraft 100 is designed to accommodate two or more occupants. In such an embodiment, the wingspan is larger, the rotors have a larger diameter, and the fuselage 107 is wider. In an alternative embodiment, aircraft 100 is an unmanned vehicle that is capable of flight without a pilot or passengers. Embodiments without passengers have additional control systems that provide directional control inputs in place of a pilot, either through a ground link or through a predetermined flight path trajectory.

Although this description has been provided in the context of specific embodiments, those of skill in the art will appreciate that many alternative embodiments may be inferred from the teaching provided. Furthermore, within this written description, the particular naming of the components, capitalization of terms, the attributes, data structures, or any other structural or programming aspect is not mandatory or significant unless otherwise noted, and the mechanisms that implement the described invention or its features may have different names, formats, or protocols. Further, some aspects of the system including components of the flight computer 500 may be implemented via a combination of hardware and software or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

Electronic components of the described embodiments may be specially constructed for the required purposes, or may comprise one or more general-purpose computers selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. An aircraft comprising:
    a fuselage;
    a forward wing coupled to the fuselage and located forward of a center of gravity;
    an aft wing coupled to the fuselage and located aft of the center of gravity;
    a first plurality of lift rotors located between the forward wing and the aft wing on a port side of the fuselage, at least one of the first plurality having a first cant and at least one of the plurality having a second cant, the second cant having an angle different from the first cant;
    a second plurality of lift rotors located between the forward wing and the aft wing on a starboard side of the fuselage, at least one of the second plurality having a third cant and at least one of the plurality having a fourth cant, the fourth cant having an angle different from the third cant;
    a propeller coupled to the fuselage for providing forward thrust; and
    a flight computer, coupled to the fuselage, and configured to independently control an amount of thrust provided by each of the first plurality and each of the second plurality of lift rotors according to a difference between a current orientation of the personal aircraft and a desired orientation of the personal aircraft.

2. The personal aircraft of claim 1 wherein the first plurality of lift rotors includes at least 4 rotors and the second plurality of lift rotors includes at least 4 rotors.

3. The personal aircraft of claim 1 wherein the flight computer is further adapted to adjust the amount of thrust provided by the lift rotors to compensate for a rotor failure.

4. The personal aircraft of claim 1, wherein the flight computer further comprises:
    a position sensor interface, adapted to receive sensor data that indicates the aircraft's position, altitude, attitude and velocity; and
    a rotor control module, coupled to the position sensor interface, adapted to determine an amount of thrust required from each of the plurality of rotors to achieve the desired orientation and to command independently each of the plurality of motors to produce the determined required thrust.

5. The personal aircraft of claim 4 wherein the flight computer further comprises:
a propeller control module coupled to the position sensor interface, adapted to determine an amount of forward thrust required from each propeller and to command the propellers to produce the required thrust.

6. The flight computer of claim 4 further comprising:
a database including programmed trajectories for ascent and descent of the aircraft.

7. The personal aircraft of claim 1 wherein the port propulsion boom and the starboard propulsion boom are each coupled to the fuselage by a plurality of struts.

8. The aircraft of claim 1 wherein the aft wing includes winglet features.

9. The aircraft of claim 8 wherein the winglets are oriented substantially in an upward vertical direction.

10. The aircraft of claim 8 wherein the winglets are oriented substantially in a downward vertical direction.

11. The aircraft of claim 1 wherein the lift rotors are driven by electric motors.

12. The aircraft of claim 1 wherein the forward and aft wings are not coplanar.

13. The aircraft of claim 1 wherein the wings are foldable.

14. The aircraft of claim 1 wherein the flight computer includes an autopilot adapted to control the aircraft in an unmanned configuration.

15. A method for flying a VTOL aircraft, the method comprising:
providing the aircraft of claim 1;
producing using the first and second plurality of rotors a vertical thrust to cause the aircraft to ascend; and
producing forward thrust to the aircraft using the propeller.

16. The method of claim 15 further comprising:
transitioning the aircraft from vertical to forward flight by reducing the vertical thrust produced by the rotors while increasing the forward thrust produced by the propeller.

* * * * *